(12) United States Patent
Nachman et al.

(10) Patent No.: US 10,236,134 B1
(45) Date of Patent: Mar. 19, 2019

(54) BATTERY THERMAL SHIELD

(71) Applicant: Amazon Technologies, Inc., Seattle, WA (US)

(72) Inventors: Ramez Nachman, Seattle, WA (US); Vikram Srinivas, Seattle, WA (US); James Robert Lim, Seattle, WA (US); Patrick Jee Tang, Seattle, WA (US); Dawnelle Ivy Wynne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 527 days.

(21) Appl. No.: 14/632,892

(22) Filed: Feb. 26, 2015

(51) Int. Cl.
| *H01G 11/18* | (2013.01) |
| *H01M 10/65* | (2014.01) |
| *H01M 10/6551* | (2014.01) |
| *H01M 10/62* | (2014.01) |
| *H01M 10/623* | (2014.01) |
| *H01M 10/0525* | (2010.01) |

(52) U.S. Cl.
CPC ........ *H01G 11/18* (2013.01); *H01M 10/0525* (2013.01); *H01M 10/5012* (2013.01); *H01M 10/5046* (2013.01); *H01M 10/623* (2015.04); *H01M 10/6551* (2015.04); *H01M 2220/30* (2013.01)

(58) Field of Classification Search
None
See application file for complete search history.

(56) References Cited

U.S. PATENT DOCUMENTS

| 7,019,490 | B2 * | 3/2006 | Sato | .................... | H01M 2/0272 320/107 |
| 2009/0186270 | A1 * | 7/2009 | Harada | ............... | H01M 2/0267 429/185 |
| 2010/0276132 | A1 * | 11/2010 | Payne | ................. | F28D 15/0266 165/169 |
| 2010/0310967 | A1 * | 12/2010 | Huang | .................. | H01M 8/008 429/507 |
| 2013/0115506 | A1 * | 5/2013 | Wayne | .............. | H01M 10/5044 429/120 |

FOREIGN PATENT DOCUMENTS

CN        102181204  A     9/2011

* cited by examiner

*Primary Examiner* — Daniel S Gatewood
(74) *Attorney, Agent, or Firm* — Lee & Hayes, P.C.

(57) ABSTRACT

A battery thermal shield is used with a battery to reduce peak temperature exposure caused by a short of a battery from physical damage to the battery (e.g., the battery being pierced by a metal object). The thermal shield may be a highly thermal-conductive substance, such as a film, adhesive, gel, and/or other substance, that acts as an efficient heat spreader. Unlike a typical heat sink or heat fins, the thermal shield may have a low profile and be configured to spread a rapid onset of heat at a localized point or area (e.g., a location of an internal short) to a wider area to reduce a peak (maximum) temperature caused by a short of a battery. The thermal shield may be at least partially formed of graphite which may be adhered to the battery.

20 Claims, 8 Drawing Sheets

BATTERY THERMAL SHIELD

BACKGROUND

High capacity batteries are frequently used in the consumer electronics. For example, lithium-ion batteries are often used to provide portable power for mobile telephones, mobile computers, tablets, cameras, and other mobile electronic devices, including robots. Lithium-ion, in particular, has a long cycle life, a relatively wide temperature range for operability (e.g., works in cold and hot environments), and a relatively low weight and small volume, making it an ideal choice for many compact electronic device applications.

One drawback of use of high capacity batteries is a potential for these batteries to incur an internal short that causes a rapid increase in temperature and may possibly result in an incurrence of a fire. Upon internal short, battery energy is converted to heat at a location of a short. The risk incurrence of a fire is higher when the shorting object is formed of a conductive material and has a relatively low heat capacity (e.g., a small sharp metal object that can pierce a battery) because in this case the heat is local to the short location and may be intense enough to start a reaction in the battery that can result in a very high temperatures from a thermal runaway caused by the short. A short may be caused when an electronic device is dropped on a sharp object or otherwise impacted by a sharp object, such as during an automobile accident, during child play, or by other incidental, accidental, or intentional activities.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to a battery thermal shield that reduces peak temperature exposure caused by a short of an electro-chemical energy storage device (e.g., a battery, an ultracapacitor, a pseudocapacitor and/or other faradaic or non-faradaic, or combinations thereof, energy storage devices) from physical damage to the electro-chemical energy storage device (e.g., a battery being pierced by a metal object). While the discussion that follows focuses on batteries, these concepts apply equally to other types of electro-chemical energy storage devices. Thus, the thermal shield may be used with ultracapacitors and other energy storage devices. The thermal shield may be implemented as a highly thermal-conductive substance, such as a film, adhesive, gel, and/or other substance, that acts as an efficient heat spreader. Unlike a typical heat sink or heat fins, the thermal shield may have a low profile (minimized thickness and weight) and be configured to spread a rapid onset of heat at a localized point or area (e.g., a location of an internal short) to a wider area to reduce a peak (maximum) temperature caused by a short of a battery. The short may be caused by physical damage to the battery, such as a structural compromise of a battery pack by an object. Although batteries may be physically damaged in different ways, some types of physical damage may result in an internal short that causes higher peak temperatures, such as a short caused by a metal pin or other sharp metal object.

The thermal shield may be used to create an outer layer or covering of the battery or battery pack. When the battery, which includes the thermal shield, is pierced by an object (e.g., a pin, a knife, or other sharp object), the object travels through the thermal shield and thus comes in physical contact with the thermal shield. The thermal shield may then efficiently spread energy (heat) generated from the battery that is localized at the object and transferred to the shield through the physical contact with the object. The shield may then reduce a peak temperature caused by a short of the battery.

In some embodiments, the thermal shield may include graphite, which may include natural graphite, synthetic graphite, or both. Graphite has good heat conductivity for a relatively low mass, which makes graphite desirable in low profile and compact electronic device applications (e.g., builds) and electronic device applications that desire to minimize weight. Graphite also allows a minimal tradeoff in battery volumetric density and gravimetric energy density. Thus, graphite and other elements with similar properties are well suited for applications of consumer electronics that desire slim profiles and low weigh.

In various embodiments, the thermal shield may comprise adhesive film that adheres to an outer surface of the battery. The thermal shield may cover some or all sides of the battery. The thermal shield may be implemented as a pouch or other container that is configured to enable insertion of the battery within the pouch or container. The pouch or container may be adhered to the battery. In some embodiments, a gel or other substance by be used in the pouch or container to create contact between the battery and the thermal shield or to otherwise further spread heat from a localized area. In accordance with one or more embodiments, the thermal shield may comprise an adhesive used to secure the battery to a housing or other component of an electronic device, the adhesive may completely cover at least a side of the battery that is proximate to the housing or other component. One advantage of the thermal shield is that it may be used with existing batteries without changes in battery material or architecture, and thus is compatible with off-the-shelf batteries.

The apparatuses and techniques described herein may be implemented in a number of ways. Example implementations are provided below with reference to the following figures.

Figure 1:
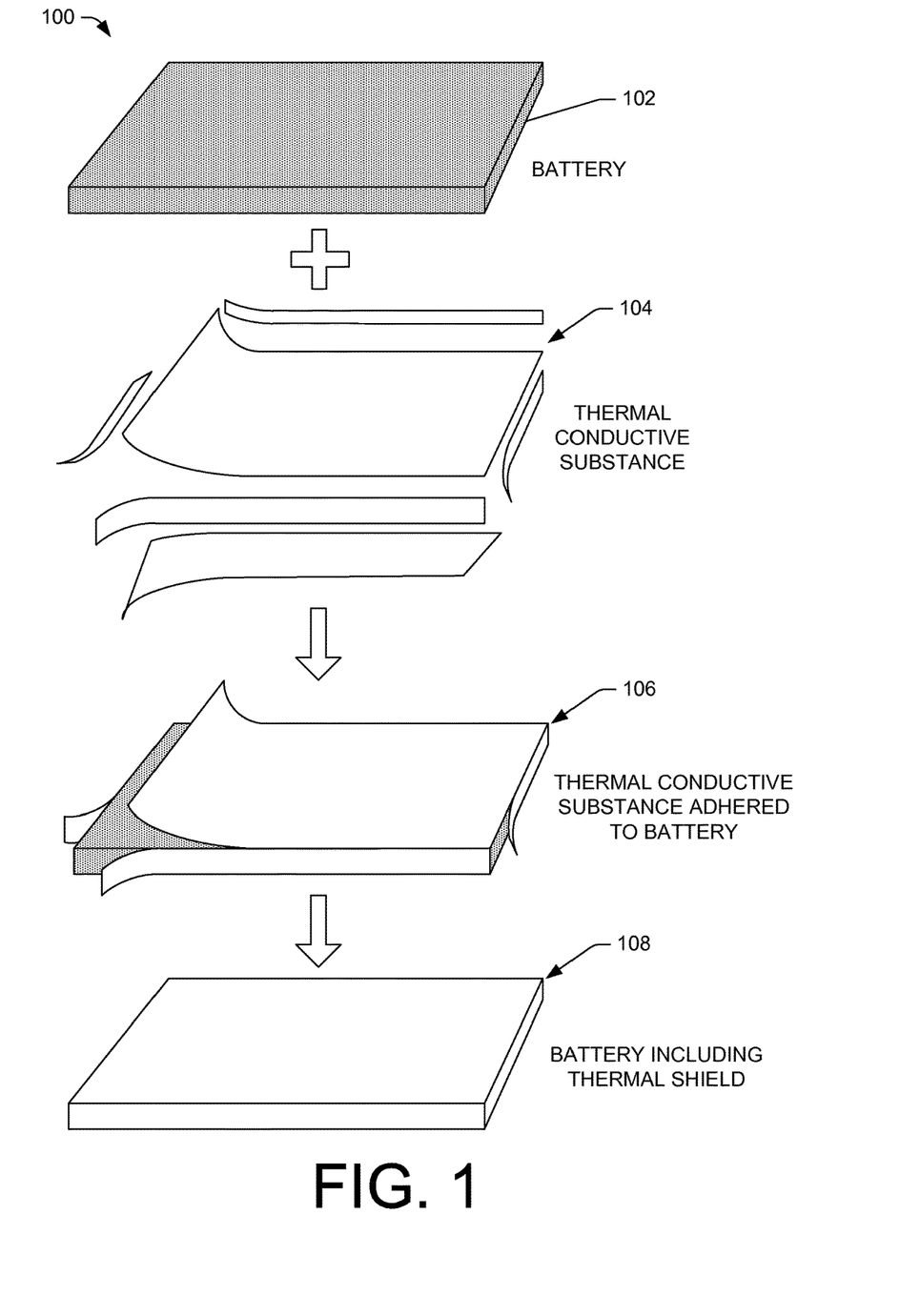
FIG. 1 is a schematic diagram of an illustrative assembly of a thermal conductive substance with a battery pack to create a thermal shield.

FIG. 1 is a schematic diagram of an illustrative electro chemical energy storage assembly 100 (hereinafter the "assembly" 100) of a thermal conductive substance with an electro chemical energy storage device (e.g., battery cell or pack) to create a thermal shield. The assembly 100 may include a battery 102. The battery 102 may be a battery pack, an individual battery, and/or a plurality of batteries. In some embodiments, the battery 102 may be a lithium-ion soft battery pack or other types of soft battery packs which are susceptible to puncture from sharp objects even when protected by a rigid housing (e.g., a plastic or metal housing). Although the battery 102 is shown as having a rectangular or cuboid shape, the battery 102 may include other regular (geometric) or irregular (non-geometric) shapes.

The assembly 100 also includes a thermal conductive substance 104. The thermal conductive substance 104 may be formed at least partially of graphite (synthetic and/or natural), compounds that include graphite, and/or other thermal conductive substances that include relatively high thermal conductivity. The substance may be a film, a curable substance, an adhesive, a woven material or fiber, or other solid substances or substances that form a solid substance (e.g., after curing). For example, the curable substance may be sprayed or painted over the exterior of the battery 102 and they cured (dried, cured with UV light, etc.) to form the thermal conductive substance 104 as a solid layer that at least partially surrounds the battery. In some embodiments, a thermal conductive gel or other non-solid substance may be used with the thermal conductive substance 104 to enhance thermal conductivity and/or further dissipate heat generated from a short of the battery 102. In accordance with one or more embodiments, the thermal conductive substance 104 may include a thermal conductivity of at least 1500 W/(m·K). A thickness of the thermal conductive substance 104 may vary from 0.09 mm to 0.33 mm for 1.1 Ah battery and 0.19 mm to 0.72 mm thickness for 2.4 Ah battery to adequately lower a peak temperature resulting from a short of the battery 102 by a piercing metal object, as described below with reference to FIG. 2. However, the thickness may proportional to a capacity of the battery 102.

In some embodiments, the thermal conductive substance 104 may include carbon-based fillers (e.g., carbon black, graphite, carbon nanotubes, graphene), metallic fillers (e.g., Ag, Au, Pt, Cu, Ni, Al, Ti, etc.), conductive fillers (e.g., conductive ceramics and conductive polymers). The thermal conductive substance may include morphologies, such that the conductive fillers may include nanostructured architectures including, without limitation, nanowires, nanotubes, nanoscrolls, nanosheets, nano-core-shell structures, hollow nanowires, hollow nanospheres, non-hallow nanospheres, nanoparticles and other tailorable nanoarchitectures, with a low percolation threshold. The thermal conductive substance may include adhesives such as elastomers, thermoplastics, emulsions, and thermosets. The thermal conductive substance may include Isotropic or Anisotropic heat conducting properties.

In some embodiments, the thermal conductive substance 104 may be adhered to the battery 102, as shown by a partial assembly 106. As used herein, the terms "adhered" and "adhesive" may include any technique or substance that causes bonding, coupling, or thermal communication between at least two different objects or elements. For example, an adhesive may include a glue, a bonding substance, and/or a glue or bonding substance applied to a solid substance (e.g., applied to a film, etc.). The partial assembly 106 shows portions of the thermal conductive substance 104 as being applied separately; however, the thermal conductive substance 104 may form a continuous layer, which may be formed as a pouch, a painted or sprayed on substance that forms a continuous layer, and so forth. A continuous layer or design may enable heat dissipation across multiple sides of the battery. Further, when different portions of the thermal conductive substance 104 are applied to the battery 102, the different portions may overlap and/or be woven together to enhance heat transfer around the battery. Weaves and other configurations may also prevent tearing or compromise of the thermal conductive substance 104 once applied to the battery 102.

A thermal shield 108 is formed over at least a portion of the battery 102, as shown in FIG. 1. In some embodiments, the thermal shield 108 may completely cover the battery 102. In various embodiments, the thermal shield 108 may only cover a side of the battery 102 that is adjacent to an exterior housing of an electronic device.

Figure 2:
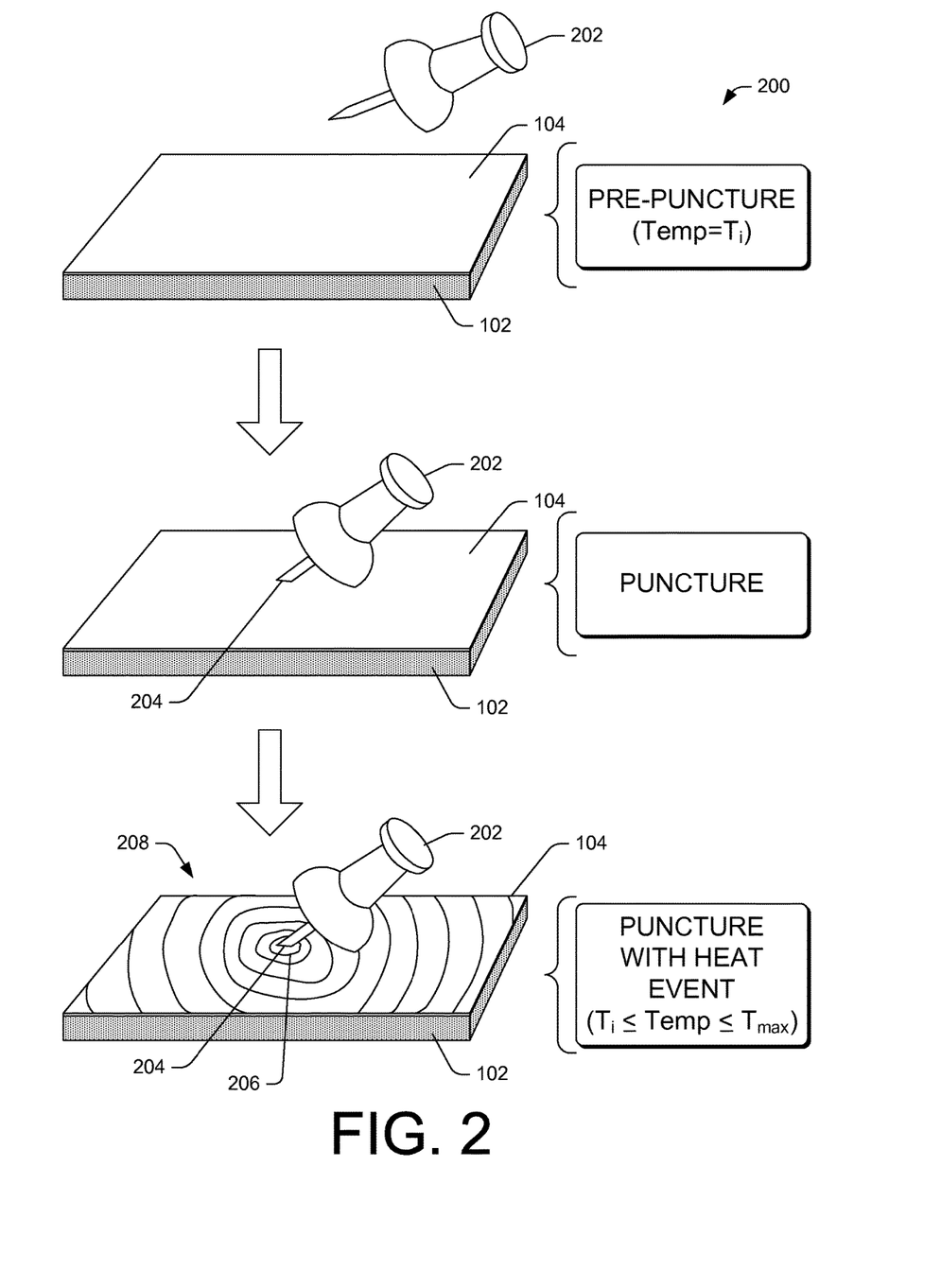
FIG. 2 is a schematic diagram of an illustrative thermal state prior to and after puncture of a battery that includes the thermal shield.

FIG. 2 is a schematic diagram of an illustrative thermal state 200 (temperature) prior to and after physical damage (e.g., puncture by an object) of a battery that includes the thermal shield. The thermal state depicts a maximum temperature (T) of the thermal shield caused by an internal short of the battery from a piercing event or other physical damage to the battery. For example, the battery 102 that includes the thermal conductive substance 104 (forming the thermal shield) may be punctured by an object 202 (shown here as a thumbtack, but may be any practically any object). The battery may be physically destroyed in other ways, such as being pinched, crushed, and so forth; however a greater temperature peak is likely caused by the battery being pierced with an object that as a resistance close to the internal resistance of the battery. Thus, a metal thumbtack provides an excellent example of an object that may cause an internal short having a high temperature. Prior to physical damage to the battery 102, the battery and/or the thermal conductive substance 104 may have a temperature (Temp) of an initial temperature ($T_0$), which may be an operational temperature of the battery, a discharging temperature, and so forth.

The object 202 may pierce the thermal conductive substance 104 and the battery 102 to cause the physical damage to the battery. For example, a person may cause the object to be inserted into the battery (likely unknowing of the consequences of such an act) or the physical damage may be caused by accident, such as by dropping an electronic device onto a sharp object. Regardless, the object may enter the battery (such as a soft battery pack) while making a thermal connection with the thermal conductive substance 104. At the immediate instance of the physical damage to the battery 102, the battery and/or the thermal conductive substance 104 may still have a temperature (Temp) of the initial temperature ($T_0$); however, an internal short caused by the object 202 may cause the temperature to quickly rise to a peak temperature ($T_{MAX}$). The internal short may cause a concentration of heat at the location of the internal short, which may be an entry point 204 of the puncture. Thus, an area 206 near the entry point 204 may receive heat, which may be dispersed or spread across the thermal conductive substance 104 as shown by a series of profiles 208, which depict spreading of the heat over a short amount of time. This spreading of the heat causes the peak temperature ($T_{MAX}$) resulting from the internal short to be less than a peak temperature experienced when the battery does not include the thermal conductive substance by at least a factor of 2 (e.g., the peak temperature is less than half as much for the battery with the thermal conductive substance as compared to a battery that does not have the thermal conductive substance).

Figure 3:
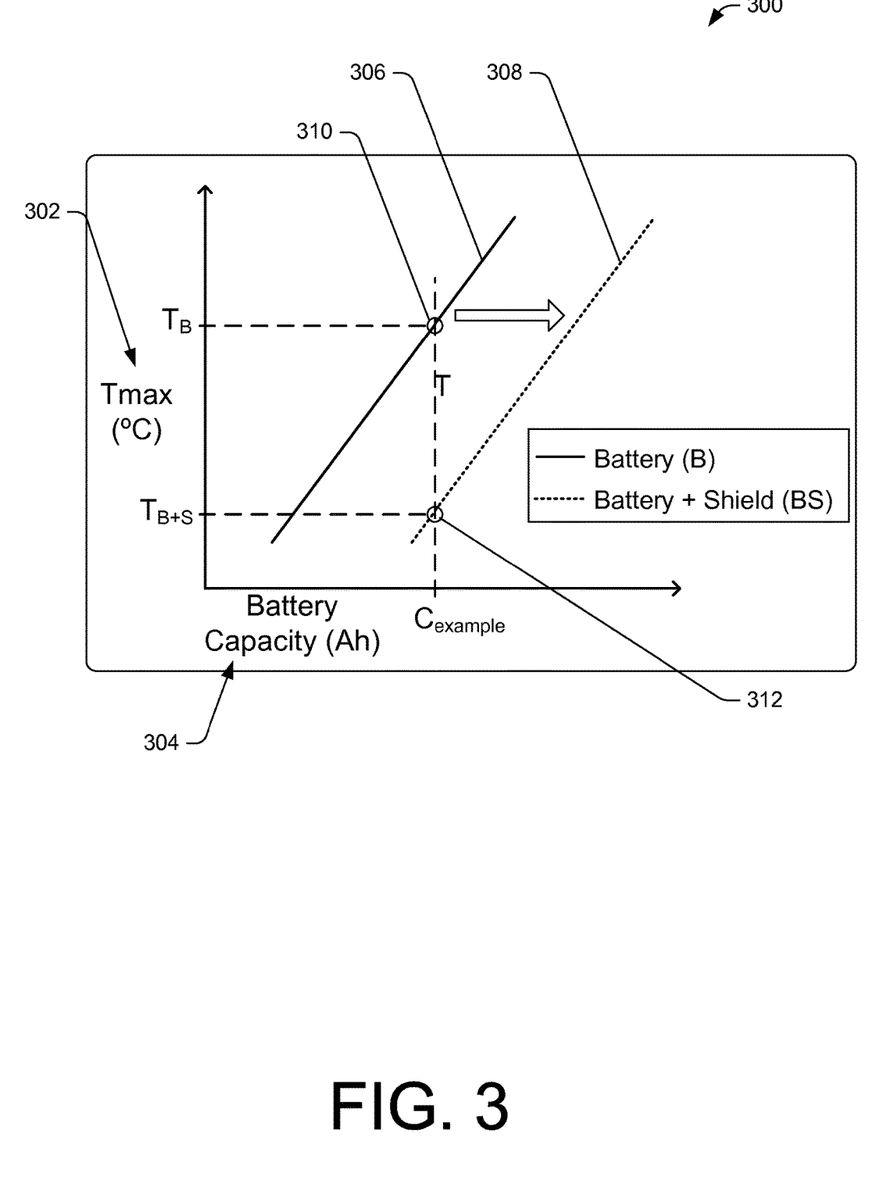
FIG. 3 is an illustrative graph showing illustrative data representing a peak thermal state of a battery without the thermal shield and a peak thermal state of a battery that includes the thermal shield.

FIG. 3 is an illustrative graph 300 showing illustrative data representing a peak thermal state of a battery without the thermal shield and a peak thermal state of a battery with the thermal shield. The graph 300 plots a maximum or peak temperature ($T_{MAX}$) 302 resulting from an internal short of the battery against a battery capacity 304. A first plot 306 represents the peak temperature data for a battery that does not include the thermal conductive substance 104 while a second plot 308 represents the peak temperature data for a battery that includes the thermal conductive substance 104 adhered to an exterior of the battery proximate the location of the short. As shown for a battery having a given example capacity, the battery without the thermal conductive substance 104 experiences a higher peak temperature ($T_B$) 310, along the first plot 306, in response to a short than a peak temperature ($T_{BS}$) 312, from the second plot 308, for the battery that includes the thermal conductive substance 104. In some embodiments, depending on the specific properties of the thermal conductive substance and the amount of coverage of the thermal conductive substance over the battery, $T_B/T_{BS}>2$.

Figure 4:
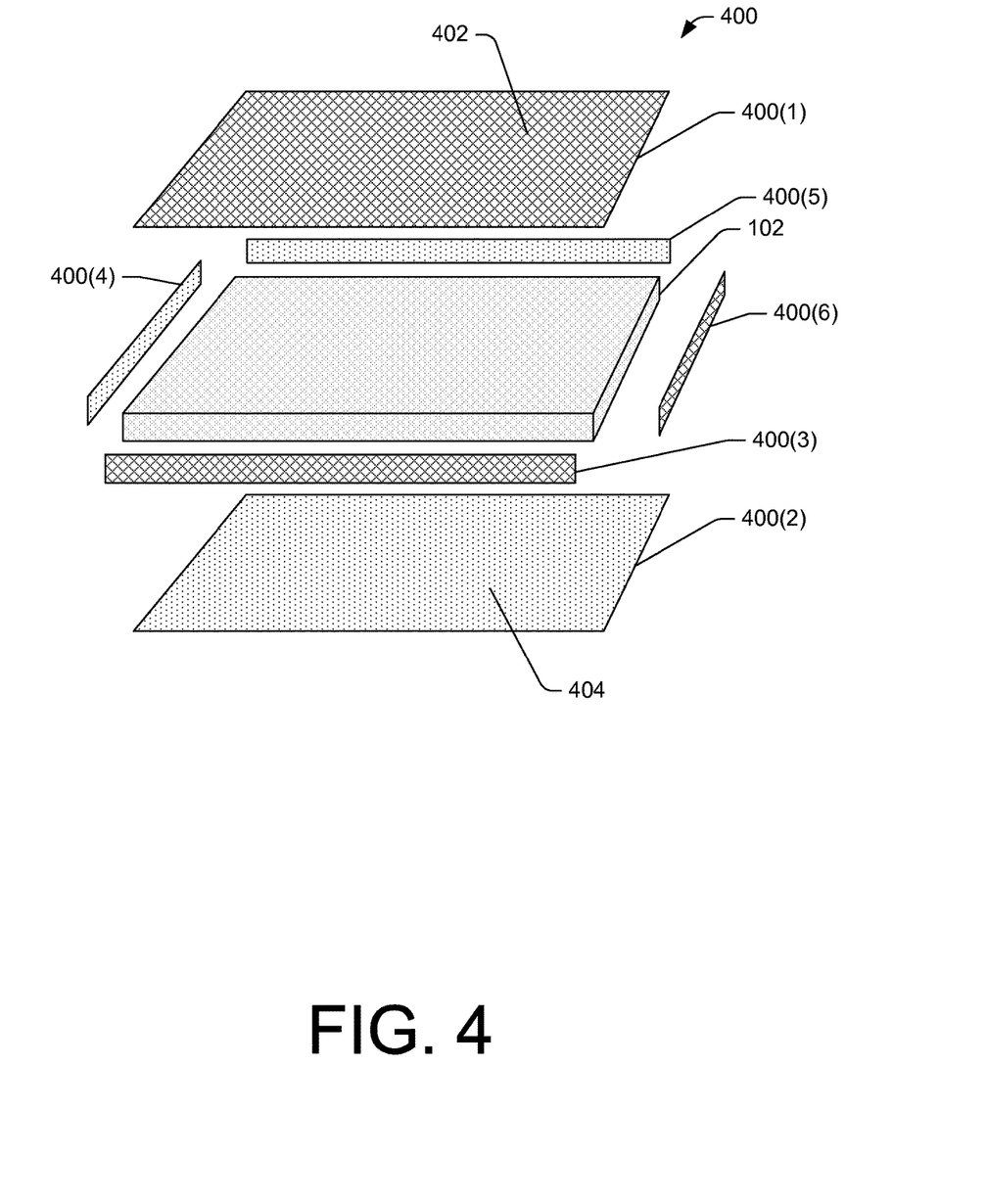
FIG. 4 is an isometric exploded view of an illustrative thermal shield to be coupled to an exterior of a battery.

FIG. 4 is an isometric exploded view of an illustrative thermal shield 400 to be coupled to an exterior of the battery 102. The thermal shield 400 is shown as including six portions 400(1)-(6); however more or fewer portions may be used. For example, the battery 102 may be covered or wrapped in as little as one sheet that is folded over the battery to cover the battery 102 or to cover a portion of the battery that is most likely to sustain physical damage (e.g., an exterior facing surface that is proximate to a housing of an electronic device).

As shown in FIG. 4, the portions may include a first side 402 and a second side 404. The first side 402 shows a formation of the thermal conductive substance, which may include a woven pattern of fibers, a compound substance, and/or other textures, structural configurations, and/or features that increase thermal conductivity and possibly increase strength (e.g., tear resistance, etc.) of the thermal conductive substance. The second side 404 shows an adhesive applied to the portion to cause the portion to adhere to the battery. As discussed above, the adhesive may be a glue, a curable compound, and/or any other element that causes the portion to adhere to the battery.

Figure 5:
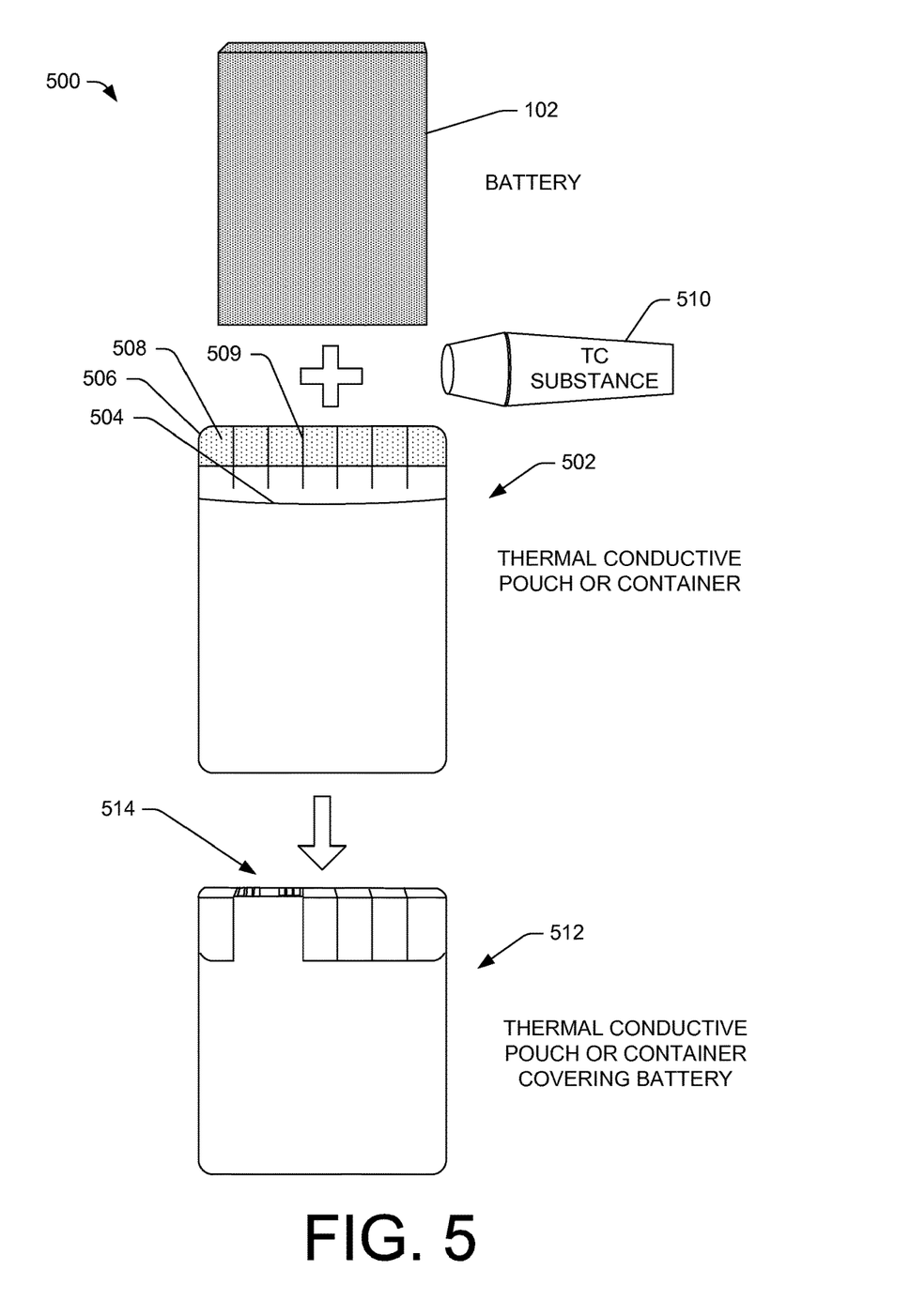
FIG. 5 is a schematic diagram showing an illustrative assembly of a battery into a thermal conductive pouch that creates a thermal shield.

FIG. 5 is a schematic diagram showing an illustrative assembly 500 of the battery 102 into a thermal conductive pouch 502 (or container) that creates a thermal shield. The thermal conductive pouch 502 may include an opening 506 that enable insertion of the battery 102 into an inner cavity of the thermal conductive pouch 502. The thermal conductive pouch 502 may include a flap 506 that can be folded over the battery 102 after the battery is inserted into the pouch in order to cover the battery 102. The flap 506 may include adhesive 508 to adhere the flap to the battery 102 and/or another portion of the thermal conductive pouch 502. The flap 506 may include one or more incisions 509 that enable exposure of leads or terminals of a battery that are placed in the thermal conductive pouch 502. In some embodiments, an interior portion of the thermal conductive pouch 502 may include adhesive to adhere to the battery 102 after the battery is inserted into the thermal conductive pouch 502. In various embodiments, a thermal conductive (TC) substance 510 may be added to the thermal conductive pouch 502 to create thermal communication between the battery 102 and the thermal conductive pouch 502. The TC substance may be an adhesive, an epoxy, a gel, and/or a fluid that may be cured, dried, untreated, or treated to adhere or be in contact with the thermal conductive pouch 502 to the battery 102. The assembly 500, after insertion of the battery 102 into the thermal conductive pouch 502, is shown as a completed assembly 512, where the flap 506 is folded over the battery 102 to cover the battery 102. As shown in the completed assembly 512, the incisions 509 may enable exposure of components 514, such as leads, a protection circuit module (PCM), and/or other components in the pouch.

In some embodiments, the thermal conductive pouch may include an integrated PCM, leads, and/or other components, which may be connected with or contact the battery (or other electro-chemical energy storage device).

Figure 6:
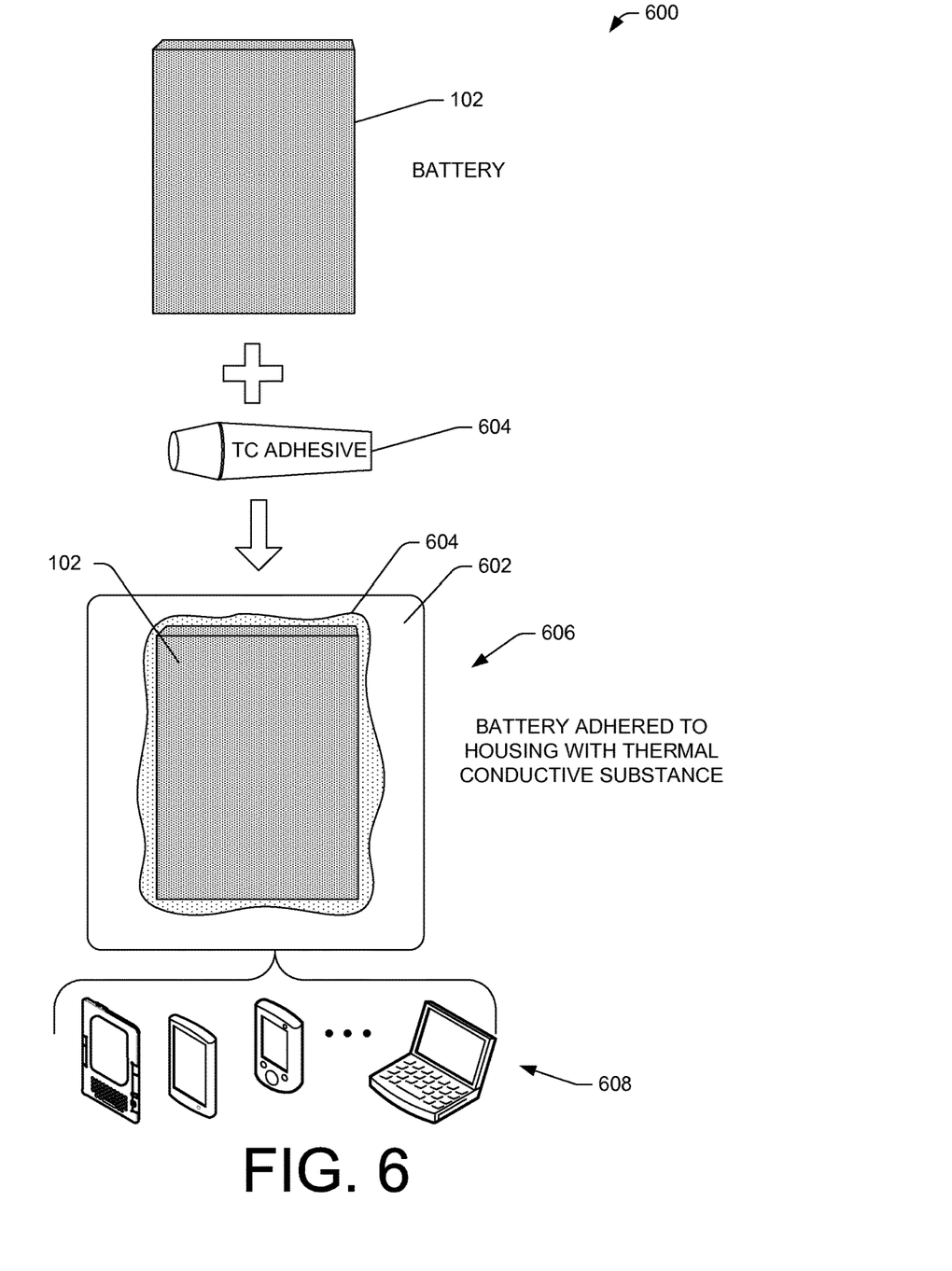
FIG. 6 is a schematic diagram showing an illustrative assembly of the battery and a housing by a thermal conductive adhesive used to secure the battery to a housing of an electronic device and/or a housing of a battery case.

FIG. 6 is a schematic diagram showing an illustrative assembly 600 of the battery 102 and a housing 602 by a thermal conductive (TC) adhesive 604 used to secure the battery to a housing of an electronic device and/or a housing of a battery case. The TC adhesive 604 may be any substance that adheres or bonds the battery to another material, which may form a housing for the battery or a housing for an electronic device. The TC adhesive 604 may be a substance that solidifies after curing and includes at least some adhesion properties. The housing may be formed of plastic, metal, or other materials or elements commonly used in housing of such devices. The TC adhesive 604 may be cured by drying, by exposure to a curing agent (e.g., UV light, a chemical, etc.), or by other known techniques. The TC adhesive 604 may create a layer that completely covers a portion of the battery that is most likely to experience a piercing event or physical damage. Thus, the TC adhesive 604, when applied, may create a layer that is pierced by an object as shown in FIG. 2 and described in the accompanying description of FIG. 2. A completed assembly 606 may include the TC adhesive 604 on a single side or face of the battery or on multiple sides/faces of the battery. For example, the TC adhesive 604 may be used to over a side of the battery that is adjacent to housing while at least some other portions of the surface of the battery are not covered by the TC adhesive. The TC adhesive 604 may completely cover all of the battery, such as by being sprayed or painted over the battery as well as a portion of the housing that adheres to the battery via the TC adhesive 604. The housing 602 may be a housing of a battery pack or a housing of an electronic device 608, such as a housing of an electronic book reader device, a mobile telephone, a tablet, a notebook computer, or any other powered electronic device that relies on battery power.

Figure 7:
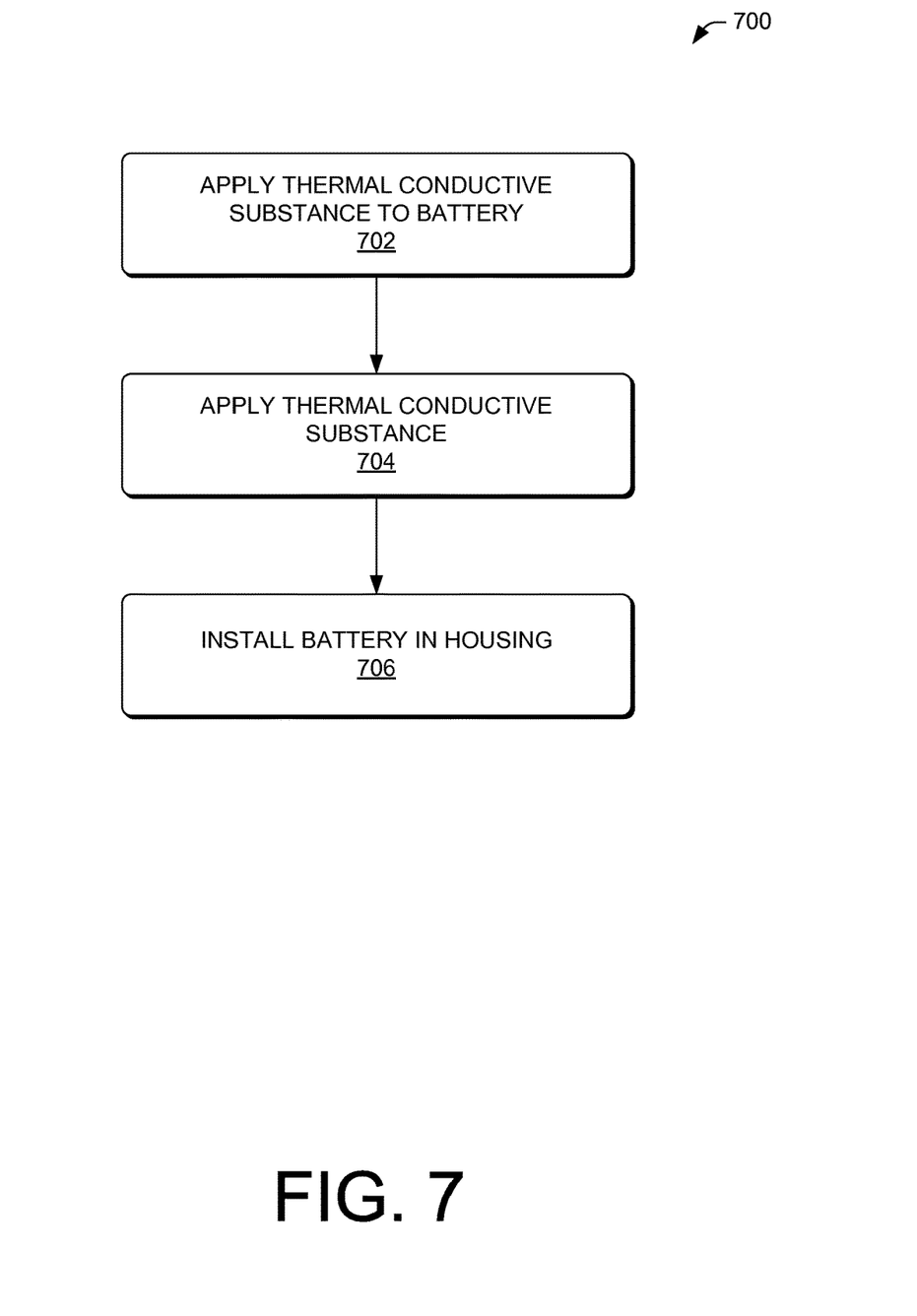
FIG. 7 is a flow diagram of an illustrative process to apply a thermal conductive substance to a battery.

FIG. 7 is a flow diagram of an illustrative process 700 to apply a thermal conductive substance to a battery. The process 700 is illustrated as a collection of blocks in a logical flow graph, which represent a sequence of operations. The order in which the operations are described is not intended to be construed as a limitation, and any number of the described blocks can be combined in any order and/or in parallel to implement the process 700.

At 702, the thermal conductive substance 104 may be applied to the battery 102. For example, the thermal conductive substance 104 may be adhered to the battery 102 by an adhesive previously added to the thermal conductive substance 104 or added to the thermal conductive substance 104 during the applying the thermal conductive substance 104 to the battery 102. The thermal conductive substance 104 may be a pouch or a container that is configured to receive the battery 102 via an inner cavity. In some embodiments, the thermal conductive substance 104 may be sprayed, poured, printed, or painted over the battery.

At 704, the thermal conductive substance may be applied. In some embodiments, the thermal conductive substance may be applied to the battery, over the battery (e.g., as a pouch, etc.), to a housing of an electronic device, to a housing of the battery, and/or as an adhesive to couple the battery to a housing. The applying the thermal conductive substance may allowing the substance to set up (e.g., by exposure to air, an elapse of time, use of a curing agent (e.g., UV light, a chemical reaction, etc.).

At 706, the battery 102 may be installed in the housing. For example, the battery may be a soft pack battery, which may be installed in a hard battery case (housing). In some embodiments, the battery may be installed directly to a housing of an electronic device, such as when the battery is intended to be irremovable from the electronic device, which is common with electronic devices such as mobile telephones, electronic book reader devices, tablet computers, and other devices that typically have an operational lifespan of only a few years.

In some embodiments, techniques may include adhering a thermal conductive graphite-based substance to a battery pack, the thermal conductive layer completely covering at least a portion of the battery pack. The thermal conductive graphite-based substance may be configured to efficiently distribute, throughout the thermal conductive graphite-based substance, heat resulting from a short of the battery pack that is caused by physical damage to the battery pack. The techniques may further include installing the battery pack with the thermal conductive graphite-based substance into a housing of an electronic device with the thermal conductive graphite-based substance positioned proximate to housing. In various embodiments, the thermal conductive graphite-based substance is an adhesive that adheres the battery pack to the housing, and the techniques may further include curing the thermal conductive graphite-based substance. The thermal conductive graphite-based substance may be formed as a pouch that covers the battery pack, and the techniques may further include placing the battery pack inside of the pouch. In some embodiments, the techniques may further include dispersing a thermally conductive substance (epoxy, adhesive, gel, etc.) into the pouch, the substance to create physical contact between the thermal conductive graphite-based substance and the battery pack. The adhering may include covering all sides of the battery pack with the thermal conductive graphite-based substance. In accordance with at least one embodiment, the thermal conductive graphite-based substance is a thermal conductive graphite-based film, and the adhering includes applying an adhesive between the thermal conductive graphite-based film and the battery pack to adhere the thermal conductive graphite-based film to the battery pack. In some embodiments, the thermal conductive film may be laminated to the material that forms a battery pouch for a soft pack battery before assembly of the battery. The battery may then be assembled, and thus include the thermal conductive film on the exterior of the assembled battery.

In various embodiments, the thermal shield may extend to cover other portions of an electronic device, such as other heat producing elements. The thermal shield may insulate these components and prevent damage to them and/or other components as a result of a battery puncture, prolonged device use (e.g., in a hot environment, etc.), and in other situations. The thermal shield may extend around a battery and continue around other components and/or be separately used to surround other components of an electronic device.

The thermal shield may be used in addition to heat sinks, which may be used with processors and/or other components that emit heat during operation.

Figure 8:
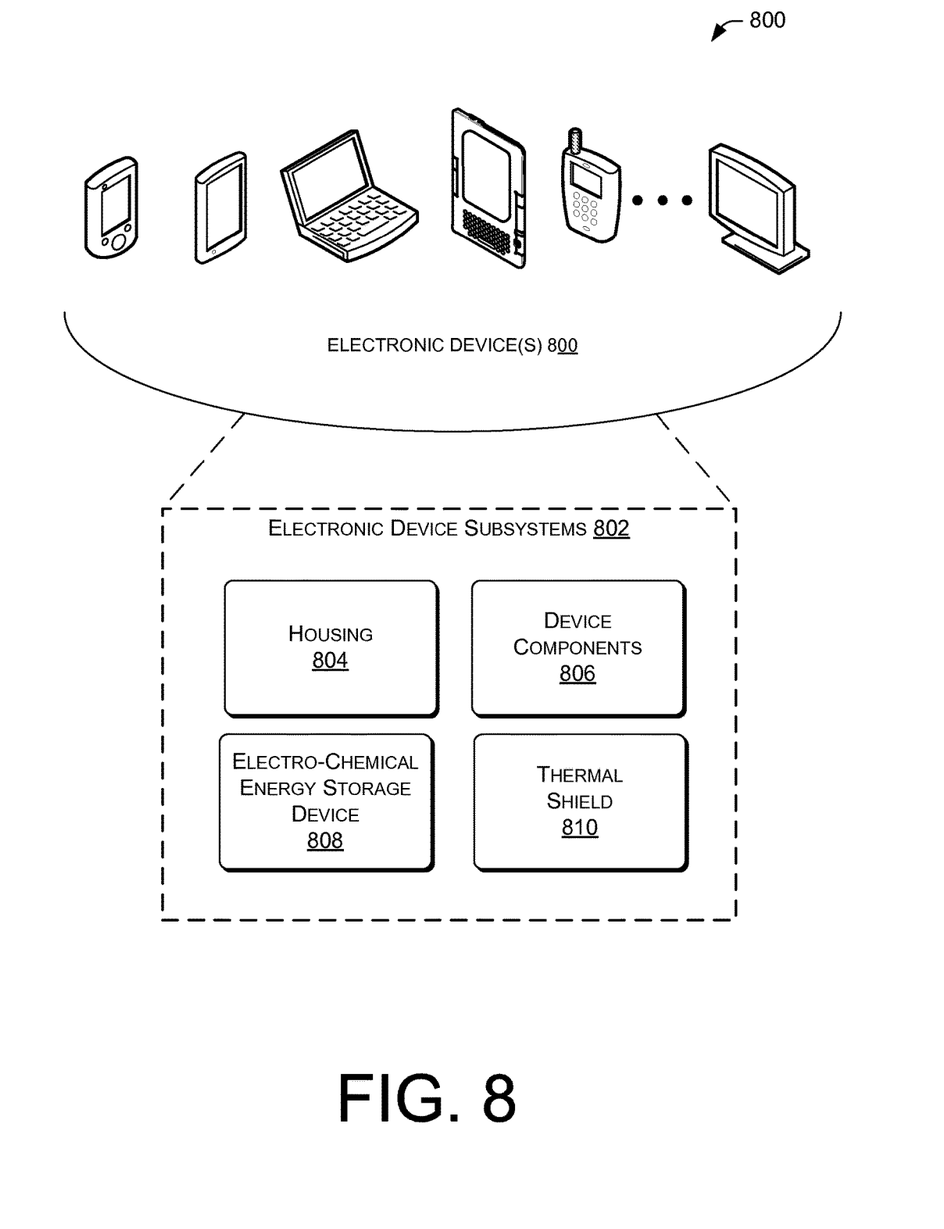
FIG. 8 is a block diagram of illustrative electronic devices that include a thermal shield.

FIG. 8 is a block diagram of illustrative electronic devices 800 that include a thermal shield. FIG. 8 shows illustrative electronic devices 800 (or simply "devices") that draw power from an electro-chemical energy storage device, such as a battery and/or a capacitor. In the illustrated implementation, the devices 800 are represented by various electronic devices that each include an electro-chemical energy storage device. A non-exhaustive list of the devices 100 may include a notebook computer, a music player, a mobile telephone (including smartphones), a tablet computer, an electronic book (eBook) reader device, and a monitor (with or without a television tuner), and so forth.

The devices 800 may include electronic device subsystems 802. The subsystems may include a housing 804, such as a case, enclosure, frame, and/or other type of structure that forms at least part of the exterior of an electronic device. For example, the housing 804 is often formed of plastic or metal and often encloses device components 806. The device components 806 may include any one or more of memory, processors, displays, speakers, lights, switches, circuit boards, and/or other components. At least some of the device components 806 may draw power from an electro-chemical energy storage device 810, such as a battery, capacitor (e.g., ultracapacitor, pseudo capacitor), or other faradic energy storage device causing electrical induction. The electro-chemical energy storage device 810 may be at least partially covered or in contact with a thermal shield 812, as discussed above with reference to FIGS. 1-7.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A battery assembly comprising:
   a battery pack configured for installation within an electronic device;
   a thermal shield that is adhered to an exterior surface of the battery pack, the thermal shield comprising a conductive graphite adhesive film configured to distribute, throughout the thermal shield, heat resulting from a short of the battery pack that is caused by physical damage to the battery pack; and
   a thermal conductive adhesive disposed on at least a portion of a first surface of the conductive graphite adhesive film, the thermal conductive adhesive adhering the conductive graphite adhesive film to the exterior surface of the battery pack, wherein the thermal conductive adhesive and the conductive graphite adhesive film form a continuous layer across the exterior surface of the battery pack that causes an increase in heat distribution throughout the exterior surface of the battery pack.

2. The battery assembly as recited in claim 1, wherein the thermal shield further comprises an additional conductive graphite adhesive film, and further comprising an additional thermal conductive adhesive disposed on at least a portion of an additional first surface of the additional conductive graphite adhesive film, the additional thermal conductive adhesive adheres the additional conductive graphite adhesive film to at least a portion of a second surface of the conductive graphite adhesive film, wherein the additional conductive graphite adhesive film and the additional thermal conductive adhesive, when cured, forms a solid layer with the conductive graphite adhesive film.

3. The battery assembly as recited in claim 1, wherein the thermal shield comprises a woven graphite layer formed of strands of graphite.

4. The battery assembly as recited in claim 1, wherein the thermal shield comprises a conductive graphite pouch having a pocket configured to receive the battery pack.

5. The battery assembly as recited in claim 1, wherein the thermal shield has a thermal conductivity of at least 1500 W/(m·K).

6. The battery assembly as recited in claim 1, wherein the thermal shield is located at least partially between the battery pack and a housing of the electronic device, and wherein the thermal shield reduces a maximum temperature of the battery pack resulting from a short of the battery pack, the maximum temperature reduced by a factor greater than two as compared to use of the battery pack without the thermal shield.

7. The battery assembly as recited in claim 1, wherein the battery pack is a lithium-ion soft battery pack.

8. The battery assembly as recited in claim 1, wherein the thermal shield completely covers a portion of the battery pack that is exposed to a housing of the electronic device.

9. An electro-chemical energy storage assembly comprising:
    an electro-chemical energy storage device configured for installation within an electronic device; and
    a thermal shield coupled to an exterior surface of the electro-chemical energy storage device, the thermal shield comprising a conductive graphite adhesive film having a first surface including a thermal conductive adhesive used to adhere the first surface of the conductive graphite adhesive film to the exterior surface of the electro-chemical energy storage device, wherein the thermal conductive adhesive and the conductive graphite adhesive film form a continuous layer across the exterior surface of the electro-chemical energy storage device that causes an increase in heat transfer throughout the exterior surface of the electro-chemical energy storage device and causes heat to dissipate through the thermal shield to prevent the electro-chemical energy storage device from catching on fire, the heat being generated from a short of the electro-chemical energy storage device caused by physical damage to the electro-chemical energy storage device, and wherein the thermal conductive adhesive has a first thermal conductivity of at least 1500 W/(m·K).

10. The electro-chemical energy storage assembly as recited in claim 9, wherein the thermal shield further comprises an additional conductive graphite adhesive film, and wherein the additional conductive graphite adhesive film has an additional first surface comprising an adhesive used to adhere the additional first surface of the additional conductive graphite adhesive film to the exterior surface of the electro-chemical energy storage device.

11. The electro-chemical energy storage assembly as recited in claim 9, wherein the thermal shield comprises a conductive graphite container having a cavity configured to receive the electro-chemical energy storage device.

12. The electro-chemical energy storage assembly as recited in claim 9, wherein the thermal shield has a second thermal conductivity of at least 1500 W/(m·K).

13. The electro-chemical energy storage assembly as recited in claim 9, wherein the electro-chemical energy storage device is a lithium-ion soft battery pack.

14. The electro-chemical energy storage assembly as recited in claim 9, wherein the electro-chemical energy storage device is a capacitor.

15. The battery assembly as recited in claim 4, wherein the conductive graphite pouch containing the battery pack therein further comprise thermal conductive gel dispersed therein, the thermal conductive gel increasing physical contact between the conductive graphite pouch and the battery pack.

16. An electronic device comprising:
    a housing of the electronic device;
    a battery pack comprising lithium-ion and configured for placement within the electronic device; and
    a thermal shield adhered to an exterior surface of the battery pack, the thermal shield comprising a layer of a woven conductive graphite formed of strands of graphite covering the battery pack, the layer of the woven conductive graphite having a first surface including a graphite-based adhesive used to adhere the first surface of the layer of the woven conductive graphite to the exterior surface of the battery pack, wherein the graphite-based adhesive and the layer of the woven conductive graphite, when cured, forms a solid layer that causes an increase in heat transfer throughout the exterior surface the battery pack, wherein the woven conductive graphite is configured to dissipate heat through the thermal shield to prevent the battery pack from catching on fire, the heat being generated from a short of the battery pack caused by puncture of the battery pack.

17. The electronic device as recited in claim 16, wherein the thermal shield further comprises an additional layer of the woven conductive graphite including an additional first surface comprising the graphite-based adhesive used to adhere the additional first surface of the additional layer of the woven conductive graphite to at least one of the exterior surface of the battery pack or a portion of a second surface of the layer of the woven conductive graphite.

18. The electronic device as recited in claim 16, wherein the thermal shield further comprises the graphite-based adhesive used to secure at least a portion of a second surface of the layer of the woven conductive graphite to a third, opposing surface of the housing.

19. The electronic device as recited in claim 16, wherein the thermal shield has a thermal conductivity of at least 1500 W/(m·K).

20. The electronic device as recited in claim 16, wherein the thermal shield comprises a second layer of the woven conductive graphite that overlaps at least a portion of the layer of the woven conductive graphite to enhance heat transfer around the battery pack.

* * * * *